US008644687B2

(12) United States Patent
Kitagawa et al.

(10) Patent No.: US 8,644,687 B2
(45) Date of Patent: Feb. 4, 2014

(54) RECORDING APPARATUS

(75) Inventors: Masao Kitagawa, Hyogo (JP); Masaru Iwasa, Hyogo (JP); Takeshi Yado, Osaka (JP)

(73) Assignee: Panasonic Corporation, Osaka (JP)

( * ) Notice: Subject to any disclaimer, the term of this patent is extended or adjusted under 35 U.S.C. 154(b) by 1141 days.

(21) Appl. No.: 12/034,472

(22) Filed: Feb. 20, 2008

(65) Prior Publication Data

US 2008/0212421 A1 Sep. 4, 2008

(30) Foreign Application Priority Data

Feb. 21, 2007 (JP) .................................. 2007-040968

(51) Int. Cl.
*H04N 5/76* (2006.01)
(52) U.S. Cl.
USPC ............ 386/294; 386/291; 386/292; 386/293; 386/295; 386/296; 386/297; 386/298; 386/299
(58) Field of Classification Search
USPC ............ 725/94; 386/249, 291, 292, 293, 294, 386/295, 296, 297, 298, 299
See application file for complete search history.

(56) References Cited

U.S. PATENT DOCUMENTS

| 6,683,989 | B1 |   | 1/2004  | Fujiwara et al.           |
|-----------|-----|---|---------|---------------------------|
| 6,934,818 | B2 | * | 8/2005  | Okada .................... 711/154 |
| 7,054,249 | B2 | * | 5/2006  | Okada .................... 369/53.11 |
| 7,269,841 | B1 | * | 9/2007  | Hendricks et al. ........ 725/94 |
| 2002/0191951 | A1 | * | 12/2002 | Sodeyama et al. ....... 386/46 |
| 2003/0198458 | A1 |   | 10/2003 | Greenwood                 |
| 2003/0221055 | A1 | * | 11/2003 | Okada .................... 711/113 |
| 2005/0084236 | A1 |   | 4/2005  | Itoh                      |
| 2005/0213448 | A1 |   | 9/2005  | Takahashi                 |
| 2006/0140583 | A1 | * | 6/2006  | Joh et al. ................ 386/83 |
| 2007/0047914 | A1 |   | 3/2007  | Park                      |
| 2008/0195824 | A1 | * | 8/2008  | Sadovsky et al. ......... 711/158 |

FOREIGN PATENT DOCUMENTS

| EP | 1 708 101 A1 | 10/2006 |
|----|--------------|---------|
| JP | 2001-145041  | 5/2001  |
| JP | 2002-305706  | 10/2002 |
| JP | 2002-369055  | 12/2002 |

(Continued)

OTHER PUBLICATIONS

"Instruction Manual for Mitsubishi DVD Recorder Type: DVR-HE50W (with BS analog tuner) & DVR HE10W," with Partial English Translation.

*Primary Examiner* — Daquan Zhao
(74) *Attorney, Agent, or Firm* — McDermott Will & Emery LLP

(57) ABSTRACT

In a recording apparatus (camcorders, optical disc recorders, etc.), the operator presses down priority designating buttons for designating priorities when recording input image data. An additional information generating section records and holds, in a storage section, additional information indicating priorities of data to be recorded (e.g., "low", "intermediate", "high", or "highest") which are set, depending on what priority designating button has been pressed down. If recordable remaining space in the storage section detected by the remaining amount detecting section falls below a predetermined value before the start of or during recording of data, a control section overwrites regions in order of priority of data which is stored therein, the lowest first, with data which is about to be recorded or is being recorded, based on the additional information generated by the additional information generating section. Therefore, even if free space in the storage medium becomes small, a decisive moment can be recoded, for example.

20 Claims, 7 Drawing Sheets

(56) References Cited

FOREIGN PATENT DOCUMENTS

| | | |
|---|---|---|
| JP | 2003-150412 | 5/2003 |
| JP | 2003-199029 | 7/2003 |
| JP | 2004-104306 | 4/2004 |
| JP | 2005-130161 | 5/2005 |
| JP | 2005-251344 | 9/2005 |
| JP | 2005-328329 | 11/2005 |
| JP | 2005-346546 | 12/2005 |
| JP | 2006-229691 | 8/2006 |
| JP | 2006-295542 | 10/2006 |
| JP | 2006-332921 | 12/2006 |

\* cited by examiner

RECORDING APPARATUS

CROSS REFERENCE TO RELATED APPLICATIONS

This Non-provisional application claims priority under 35 U.S.C. §119(a) on Patent Application No. 2007-040968 filed in Japan on Feb. 21, 2007, the entire contents of which are hereby incorporated by reference.

BACKGROUND OF THE INVENTION

1. Field of the Invention

The present invention relates to a recording apparatus for recording data into a storage medium.

2. Description of the Related Art

In recent years, semiconductor storage devices (optical disc media, hard disks, flash memories, etc.) have become the mainstream as devices for recording, as digital data, video or audio taken by video recorders for recording television programs, digital camcorders, digital still cameras, and the like. The storage capacities of these recording devices are increasing year by year, but are finite. Due to the limit of the storage capacity, there will be a shortage of free space. In such a situation, for example, a video recorder fails to record a whole program, or a digital camcorder or a digital camera fails to record at a picture or scene at a decisive moment.

In order to solve the problem that recording cannot be performed when a shortage of free space occurs, Japanese Unexamined Patent Application Publication No. 2005-251344 discloses the following technique. Two hard disks are provided so as to address possible disk failure. The same data is normally recorded into the two disks as insurance against hard disk failure. When there is not enough free space to record a program, it is determined whether or not there is an information file which is doubly recorded. If there is an information file which is doubly recorded, the doubly-recorded information file is deleted from one of the two hard disks to secure free space required for recording in the one hard disk. A program is recorded into the free space rather than double recording, thereby avoiding failure of recording the program.

In the conventional technique above, however, if a shortage of free space continually occurs, doubly-recorded information files are deleted from one disk to secure free space, information files are continually recorded into the free space. However, if there is no longer a doubly-recorded information file which can be deleted, no more free space can be obtained. In this case, data which is being currently recorded or is about to be recorded fails to be recorded.

Also, in the conventional technique above, a plurality of hard disks are required for double recording, resulting in high cost.

SUMMARY OF THE INVENTION

An object of the present invention is to provide a recording apparatus capable of preventing data which is being currently recorded or is about to be recorded from failing to be recorded due to a shortage of free space.

To achieve the object, the present invention provides a recording apparatus in which additional information which does not relate to the order in which the data were recorded is added to data which have already been recorded and held, and a portion of the data is deleted, compressed and held again, or moved to another recording medium based on the additional information, so as to consistently secure free space in an existing storage medium.

Specifically, a recording apparatus comprises a storage section for recording and holding any data and additional information corresponding to the data, a remaining amount detecting section for detecting remaining recordable space in the storage section, a control section for operating the data recorded and held in the storage section, and an additional information generating section for generating the additional information to be recorded and held in the storage section. The control section sets priorities for the data recorded and held in the storage section based on the additional information generated by the additional information generating section irrespective of the order in which the data were recorded and held into the storage section. When the remaining amount detecting section detects a remaining amount below a predetermined value before the start of or during recording of data into the storage section, the control section deletes, or compresses a data size of, data having a lowest priority based on the priorities.

In an example, the recording apparatus of the present invention further comprises one or more priority buttons each indicating a priority. When an operator presses the one or more priority buttons, the additional information generating section generates additional information indicating priorities corresponding thereto.

In an example, the recording apparatus of the present invention further comprises a program information obtaining section for analyzing information about the data to obtain keywords. The additional information generating section handles, as additional information, the keyword obtained by the program information obtaining section. The control section sets priorities for the data based on whether or not the keywords obtained by the program information obtaining section match respective predetermined keywords.

In an example, the recording apparatus of the present invention further comprises a program information obtaining section for analyzing information about the data to obtain rating points of TV programs. The control section sets higher priorities for the data having higher rating points of the TV programs, and overwrites a region in which data having a lowest priority is stored, with data which is about to be recorded or is being currently recorded.

In an example, the recording apparatus of the present invention further comprises a program information obtaining section for analyzing information about the data to obtain game results of sports programs. The additional information generating section handles, as additional information, the game results of the sports programs obtained by the program information obtaining section. The control section sets priorities for the data based on whether or not the game results of the sports programs match a predetermined game result.

In an example, the recording apparatus of the present invention further comprises a sound level detecting section for detecting sound levels of each piece of the data. The additional information generating section detects a highest one of the sound levels detected by the sound level detecting section and generates the highest sound level as additional information.

In an example, in the recording apparatus of the present invention, the sound level detecting section, when data is recorded into the storage section, detects sound levels of the data.

In an example, in the recording apparatus of the present invention, the sound level detecting section, when data is read from the storage section, detects sound levels of the data.

In an example, in the recording apparatus of the present invention, the additional information generating section determines and generates, as additional information, priorities for the data using one or a plurality of predetermined sound level thresholds based on the highest sound levels of the data detected by the sound level detecting section.

In an example, in the recording apparatus of the present invention, the sound level thresholds for determining priorities can be externally set in the additional information generating section.

In an example, in the recording apparatus of the present invention, the additional information generating section further measures and generates, as additional information, durations for which the sound levels detected by the sound level detecting section continue to be higher than or equal to a predetermined sound level.

In an example, in the recording apparatus of the present invention, the additional information generating section determines and generates, as additional information, priorities based on the sound level durations using one or a plurality of predetermined duration thresholds.

In an example, in the recording apparatus of the present invention, the sound level thresholds for measuring durations can be externally set in the additional information generating section.

In an example, in the recording apparatus of the present invention, the one or plurality of durations for determining priorities can be externally set in the additional information generating section.

In an example, in the recording apparatus of the present invention, the additional information generating section generates additional information indicating copy histories of the data or additional information indicating whether or not the data have been playbacked.

In an example, in the recording apparatus of the present invention, the data recorded and held in the storage section is data encoded before the recording and holding. During the data size compression, the control section re-encodes the encoded data recorded and held in the storage section so that the resultant data has a smaller bit rate than that of the encoded data recorded and held in the storage section.

In an example, in the recording apparatus of the present invention, the data recorded and held in the storage section is data encoded before the recording and holding. During the data size compression, the control section re-encodes the encoded data recorded and held in the storage section so that the encoded data recorded and held in the storage section is quantized using a larger quantization value than that of the encoded data recorded and held in the storage section.

In an example, in the recording apparatus of the present invention, the data recorded and held in the storage section is data encoded before the recording and holding. During the data size compression, the control section re-encodes the encoded data recorded and held in the storage section so that the resultant data has a larger keyframe interval than that of the encoded data recorded and held in the storage section.

In an example, in the recording apparatus of the present invention, the data recorded and held in the storage section is data encoded before the recording and holding. During the data size compression, the control section re-encodes the encoded data recorded and held in the storage section so that the resultant data has a smaller image size than that of the encoded data recorded and held in the storage section.

In an example, in the recording apparatus of the present invention, the data recorded and held in the storage section is data encoded before the recording and holding. During the data size compression, the control section re-encodes the encoded data recorded and held in the storage section using an encoding method (algorithm) having a higher data compression efficiency than that of the original encoding method (algorithm).

A recording apparatus according to the present invention comprises a first storage section and a second storage section for recording and holding any data, a remaining amount detecting section for detecting remaining recordable space in the first storage section, and a control section for operating the data recorded in the first and second storage sections. When the remaining amount detecting section detects a remaining amount below a predetermined value before the start of or during recording of data into the first storage section, the control section switches a recording target from the first storage section to the second storage section.

A recording apparatus according to the present invention comprises a first storage section and a second storage section for recording and holding any data and additional information corresponding to the data, a remaining amount detecting section for detecting remaining recordable space in the first storage section, and a control section for operating the data recorded in the first and second storage sections. When the remaining amount detecting section detects a remaining amount below a predetermined value before the start of or during recording of data into the first storage section, the control section sets priorities for the data stored in the first storage section based on the additional information stored in the first storage section, and moves the data to the second storage section in order of priority, the lowest first.

Thus, according to the recording apparatus of the present invention, if there is a shortage of free space in the storage section, a portion of the data is overwritten, compressed to obtain free space, or moved to another storage medium based on additional information which is added to data which have already been recorded and held and does not relate to the order in which the data were recorded. Thereby, it is possible to reliably record data which is being currently recorded or is about to be recorded, and therefore, avoid failure of recording.

The present invention is considerably useful for, for example, a digital camera apparatus or a camcorder for recording images or video. Specifically, if the storage section has only small free space, then when the operator suddenly encounters a decisive moment and needs to record an image, recording of image data which is being currently recorded or is about to be recorded is given a highest priority.

Also, the present invention is also useful for a recorder apparatus for recording images or video. Specifically, if the operator suddenly encounters a decisive moment in a television program which is being currently broadcast, but for which timer recording has not been made, and needs to record the program, recording of the currently broadcast program is given a highest priority.

DETAILED DESCRIPTION OF THE PREFERRED EMBODIMENTS

Hereinafter, the present invention will be described, by way of example, with reference to the accompanying drawings.

EXAMPLE 1

Hereinafter, Example 1 of the present invention will be described with reference to FIG. 1.

Figure 1:
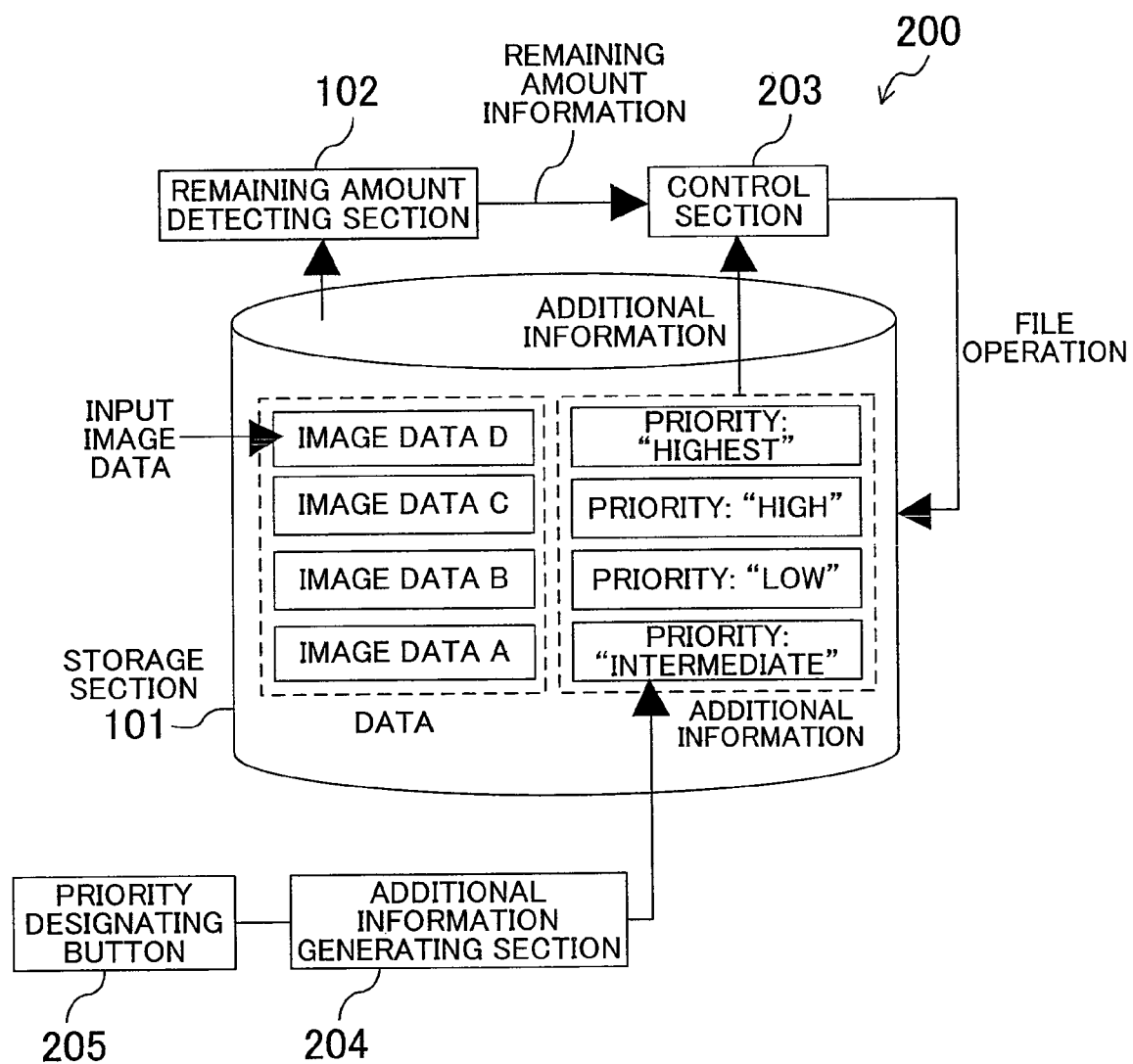
FIG. 1 is a diagram schematically showing a whole configuration of a recording apparatus according to Example 1 of the present invention.

FIG. 1 shows a configuration of a recording apparatus according to Example 1 of the present invention. The recording apparatus 200 of Example 1 is a digital camera apparatus, a camcorder, or a recorder apparatus for recording images or video, which has a storage section 101 for storing input data, a remaining amount detecting section 102 for detecting free space for saving data in the storage section 101 to generate remaining amount information, and a control section 203 for controlling a file recorded in the storage section 101. The recording apparatus 200 further has a priority designating button (priority button) 205 which is pressed down by the user when designating a priority, and an additional information generating section 204 for generating additional information based on information from the priority designating button 205.

A detailed configuration and an operation of the thus-configured recording apparatus of Example 1 of the present invention will be described.

Input image data is recorded and saved into the storage section 101 of the recording apparatus 200. Also, a priority designated by the user (operator) pressing down the priority designating button 205 is written as additional information into the storage section 101 of the recording apparatus 200 by the additional information generating section 204.

When remaining space in the storage section 101 detected by the remaining amount detecting section 102 falls below a predetermined value, the control section 203 ranks pieces of image data already stored in the storage section 101 based on the priorities of the pieces of image data given by the additional information generating section 204, deletes image data having a low priority to secure free space, and allocates the free space to newly input image data to be recorded.

For example, in FIG. 1, there are four files of image data A to D. The image data D is image data which is being currently recorded or is about to be recorded, and the image data A to C are image data which have already been recorded. A to C indicate the order of time when the image data were recorded into the storage section 101, the earliest first. The additional information generating section 204 ranks the priorities of the image data A to D designated by the user (operator) pressing down the priority designating button 205 as "immediate", "low", "high", and "highest", respectively. The image data D has the "highest" priority because it is being currently recorded or is about to be recorded. In this situation, if remaining space in the storage section 101 falls below the predetermined value, the image data B having the lowest priority is deleted so as to record the image data D. If there is still a shortage of free space required for recording of the image data D even after the image data B is deleted, the image data A having the second lowest priority is deleted.

As described above, according to Example 1, if remaining space of the storage section 101 in which data can be written becomes small when image data is being currently recorded or is about to be recorded, the control section 203 controls the storage section 101 so that image data having a lower priority is automatically deleted using priorities recorded as additional information, and is overwritten with the image file which is being currently recorded or is about to be recorded. Thereby, it is possible to continually secure free space in the storage section 101. As a result, it is possible to prevent image data which is being currently recorded or is about to be recorded from failing to be recorded due to a shortage of free space.

This is considerably useful for, for example, a digital camera apparatus or a camcorder for recording images or video. Specifically, the user previously performs shooting while pressing one or a plurality of priority designating buttons 205 provided on the recording apparatus 200 to set a priority for a scene which is shot by the user. If the storage section 101 has only small free space, then when the user suddenly encounters a decisive moment and needs to record an image, data of a scene which was shot in the past and does not have a very high priority is deleted, and recording of image data which is being currently recorded or is about to be recorded is given a highest priority. Note that the timing of giving a priority is not limited to shooting, and alternatively, a priority may be given by pressing a priority button after confirming a captured image by playback (viewing).

The above-described technique is also useful for a recorder apparatus for recording images or video. Specifically, in the case of recording or timer recording of a television program, the user previously presses one or a plurality of priority designating buttons provided on the apparatus to set a priority for the program. If the storage section 101 has only small free space, then when the user suddenly encounters a decisive moment in a television program which is being currently broadcast, but for which timer recording has not been made, and needs to record the program, data of a program which was recorded in the past and does not have a very high priority is deleted, and recording of the currently broadcast program is given a highest priority. Note that the timing of giving a priority is not limited to recording or timer recording, and alternatively, a priority may be given by pressing a priority button after confirming a captured image by playback (viewing).

Note that this example is effective irrespective of whether image data is of moving image or still image. Also, although priorities are designated by pressing down the priority designating button 205 during image recording in this example, priorities may be designated by pressing down the priority designating button 205 during playback of a recorded image.

Also, the timing with which a file is deleted to secure free space is when the remaining space of the storage section 101 falls below the predetermined value. Therefore, the timing may be before or during recording of new image data.

EXAMPLE 2

Hereinafter, Example 2 of the present invention will be described with reference to FIG. 2.

Figure 2:
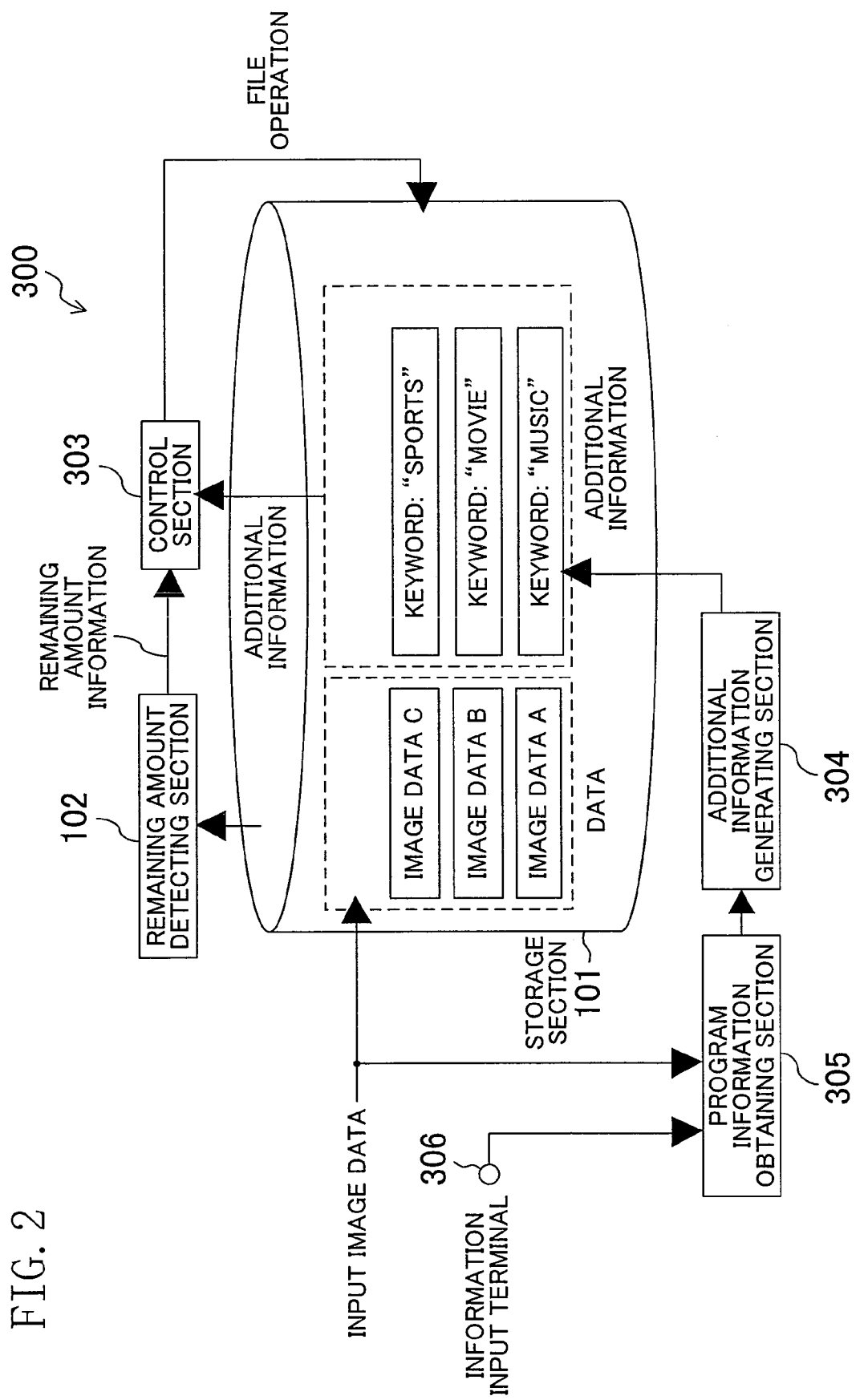
FIG. 2 is a diagram schematically showing a whole configuration of a recording apparatus according to Example 2 of the present invention.

In FIG. 2 showing Example 2, the same parts as those of Example 1 of the present invention are indicated by the same names and reference numerals, and their detailed operations will not be described.

FIG. 2 shows a configuration of a recording apparatus according to Example 2 of the present invention. The recording apparatus 300 of Example 2 is a digital camera apparatus, a camcorder, or a recorder apparatus for recording images or video, which has a storage section 101, a remaining amount detecting section 102, an information input terminal 306 through which information about input data is input, a program information obtaining section 305 for obtaining necessary information through the information input terminal 306 or from the input data, an additional information generating section 304 for generating additional information based on information from the program information obtaining section 305, and a control section 303 for controlling a file recorded in the storage section 101 based on the information added by the additional information generating section 304.

A detailed configuration and an operation of the thus-configured recording apparatus of Example 2 of the present invention will be described.

Input image data is recorded into the storage section 101 of the recording apparatus 300. Also, the information relating to the image data obtained by the program information obtaining section 305 is written as additional information into the storage section 101 of the recording apparatus 300 by the additional information generating section 304.

When remaining space in the storage section 101 detected by the remaining amount detecting section 102 falls below a predetermined value, the control section 303 sets priorities for pieces of image data which have already been stored, based on the information added to each piece of image data by the additional information generating section 304, deletes image data having a low priority to secure free space, and allocates the free space to newly input image data to be saved.

For example, in FIG. 2, there are three files of image data A to C. The image data C is image data which is being currently recorded or is about to be recorded, and the image data A and B are image data which have already been recorded. When the image data A and B are recorded, information about the image data A and B are input through the information input terminal 306 to the program information obtaining section 305. Specifically, the information is, for example, EPG (Electronic Program Guide) obtained via data broadcasting, Internet connection, or the like. The program information obtaining section 305 analyzes the information input through the information input terminal 306 to obtain a "keyword", which is then recorded as additional information into the storage section 101 by the additional information generating section 304.

In FIG. 2 described in this example, "music" is obtained from the image data A, and "movie" is obtained from the image data B, and they are recorded as keyword information. The operator previously sets priorities for "keywords". For example, the priorities of keywords "sports", "movie", and "music" are ranked in this stated order, the highest first ("sports">"movie">"music"). The control section 303 performs a file operation using these priorities.

In this case, the image data A having the lowest priority is deleted so as to record the image data C, and the image data C is recorded into the deleted region. Even if the image data A is deleted, there may be still a shortage of free space required for recording of the image data C. In this case, the image data B having the second lowest priority is deleted.

As described above, according to Example 2, if remaining space of the storage section 101 in which data can be written becomes small when image data is being currently recorded or is about to be recorded, the control section 303 controls the storage section 101 so that image data having a lower priority is automatically deleted using priorities recorded as additional information, and is overwritten with the image file which is being currently recorded or is about to be recorded. Thereby, it is possible to continually secure free space in the storage section 101. As a result, it is possible to prevent image data which is being currently recorded or is about to be recorded from failing to be recorded due to a shortage of free space.

This is useful for, for example, a recorder apparatus for recording images or video. Specifically, in the case of recording or timer recording of a television program, the user previously sets, as priorities, one or a plurality of options (keywords) provided on the apparatus. If the storage section 101 has only small free space, then when the user suddenly encounters a decisive moment in a television program which is being currently broadcast, but for which timer recording has not been made, and needs to record the program, data of a program which was recorded in the past and does not have a very high priority is deleted, and recording of the currently broadcast program is given a highest priority.

Note that this example is effective irrespective of whether image data is of moving image or still image. Also, in this example, the program information obtaining section 305 analyzes and obtains information from the information input terminal 306. Alternatively, information (VBI, etc.) included in input data may be used.

Also, in this example, the program information obtaining section 305 selects a "keyword" as additional information from information obtained from the information input terminal 306. Alternatively, "ratings point", "game result" of a sports program or the like, or other information may be selected as additional information. Further, what is to be selected may be externally set.

In addition, the timing with which a file is deleted to secure free space is when the remaining space of the storage section 101 falls below the predetermined value. Therefore, the timing may be before or during recording of new image data.

Also, in this example, the priorities of "sports", "movie", and "music" in the control section 303 are designated as "sports">"movie">"music". Alternatively, the designation may be externally performed.

Further, in this example, additional information is output from the additional information generating section 304 when image data is stored into the storage section 101. Alternatively, additional information output from the additional information generating section 304 may be updated and recorded as required.

EXAMPLE 3

Hereinafter, Example 3 of the present invention will be described with reference to FIG. 3.

Figure 3:
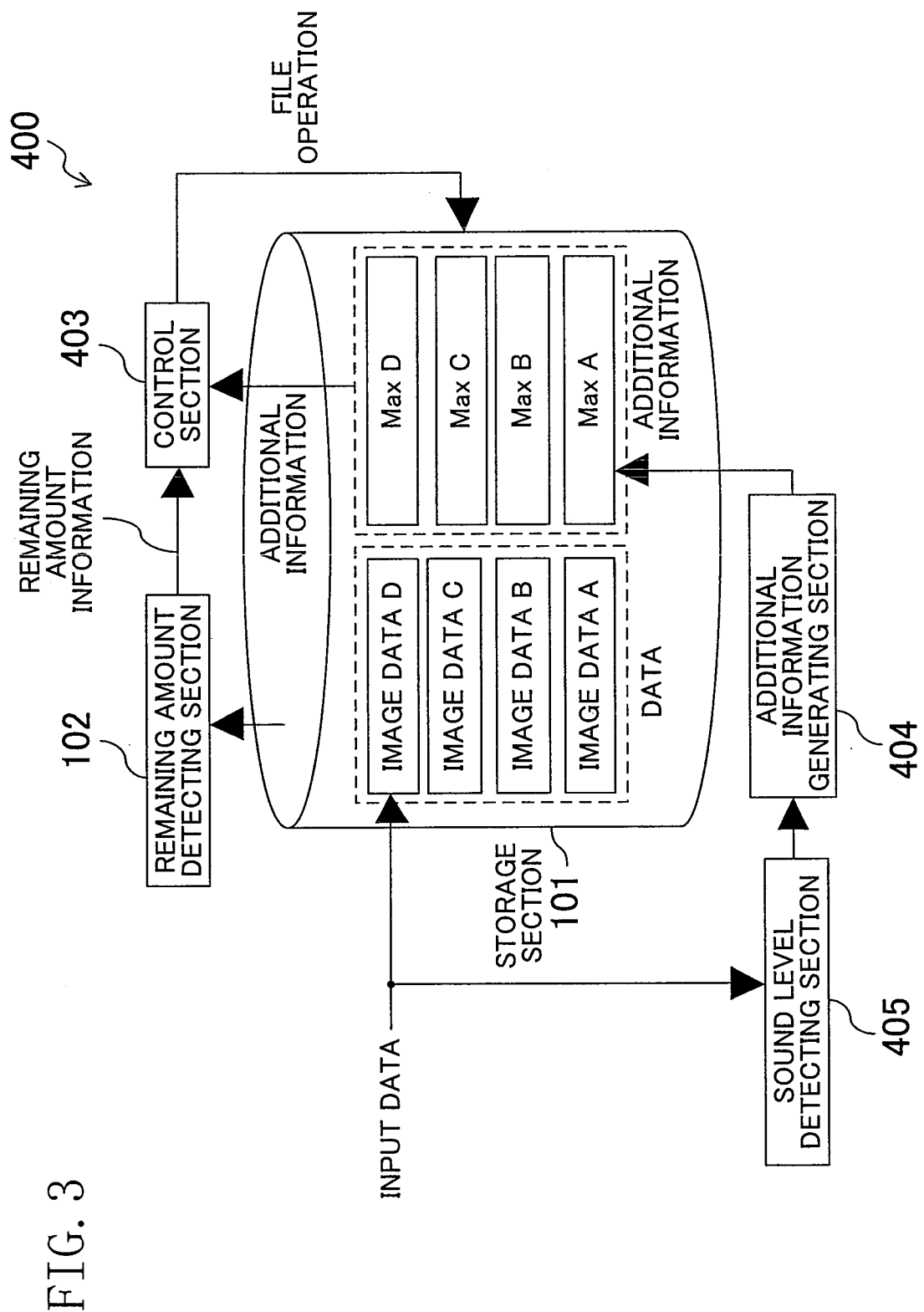
FIG. 3 is a diagram schematically showing a whole configuration of a recording apparatus according to Example 3 of the present invention.

In FIG. 3 showing Example 3, the same parts as those of Example 1 of the present invention are indicated by the same names and reference numerals, and their detailed operations will not be described.

FIG. 3 shows a configuration of a recording apparatus according to Example 3 of the present invention. The recording apparatus 400 of Example 3 is a digital camera apparatus, a camcorder, or a recorder apparatus for recording images or video, which has a storage section 101, a remaining amount detecting section 102, a control section 403, an additional information generating section 404 for generating additional information based on information from the outside, and a sound level detecting section 405 for detecting a sound level of input data.

A detailed configuration and an operation of the thus-configured recording apparatus of Example 3 of the present invention will be described.

Input data is recorded and saved into the storage section 101 of the recording apparatus 400. Also, a sound level is detected by the sound level detecting section 405 for detecting the sound level of the input data, and the highest value of the sound level is written and recorded as additional information into the storage section 101 by the additional information generating section 404.

When remaining space in the storage section 101 detected by the remaining amount detecting section 102 falls below a predetermined value, the control section 403 ranks priorities of pieces of data which have already been stored based on the highest sound level added to each piece of data by the additional information generating section 404, deletes data having a low priority to secure free space, and allocates the free space to newly input data to be saved.

For example, in FIG. 3, there are four files of data A to D. The data D is data which is being currently recorded or is about to be recorded, and the data A to C are data which have already been recorded. The highest sound level of the data A is represented by "MaxA", the highest sound level of the data B is represented by "MaxB", the highest sound level of the data C is represented by "MaxC", and the highest sound level of the data D is represented by "MaxD".

The sound levels have the following relationship: MaxB<MaxA<MaxC. The highest sound level of the data D is not yet determined during recording and its additional information is not yet determined. The control section 403 may set and rank priorities for the pieces of data in order of sound level (the lowest of the highest sound levels corresponds to the lowest priority), and may delete data having a low priority.

In this case, the data B having the lowest sound level (i.e., the lowest priority) is deleted so as to record the data D. Even if the data B is deleted, there may be still a shortage of free space required for recording of the data D. In this case, the image data A having the second lowest priority is deleted.

As described above, according to Example 3, if remaining space of the storage section 101 in which data can be written becomes small when image data is being currently recorded or is about to be recorded, the control section 403 controls the storage section 101 so that data having a lower priority is automatically deleted using priorities recorded as additional information, and is overwritten with the file which is being currently recorded or is about to be recorded. Thereby, it is possible to continually secure free space in the storage section 101. As a result, it is possible to prevent data which is being currently recorded or is about to be recorded from failing to be recorded due to a shortage of free space.

For example, it is assumed that, at decisive or exciting scenes, cheering audience gives a loud shout, so that a recorded sound level is high in a digital camera apparatus or a recorder apparatus for recording images or video. Priorities are previously set and ranked in order of sound level. If the storage section 101 has only small free space, then when a decisive moment occurs and image recording is suddenly required, data which was recorded in the past and does not have a very high priority is deleted, and recording of image data which is being currently recorded or is about to be recorded is given a highest priority.

Also, in a recorder apparatus for recording images or video, priorities are set for television programs during recording or playback, depending on the highest sound level. If the storage section 101 has only small free space, then when a decisive moment occurs in a television program which has not been set for timer recording and is being currently broadcast (i.e., recording is suddenly required), data of a program which was recorded in the past and does not have a very high priority is deleted, and recording of the currently broadcast program is given a highest priority.

Note that this example is effective to data containing audio irrespective of whether the data is of moving image or still image. The data may be a file containing only audio.

Further, in this example, sound levels are detected during data recording, and the highest sound level is generated as additional information. Alternatively, sound levels may be detected during reading and playback of data from the storage section 101 and the highest sound level may be generated as additional information.

In addition, the highest value of detected sound levels is stored in this example. Alternatively, a time for which sound levels continue to take a predetermined value or more may be measured, the measured time may be generated as additional information, and data having a shorter duration may be deleted.

Also, in the additional information generating section 404, the highest value of detected sound levels or a measured time is generated as additional information. Priorities may be previously set and ranked, depending on one or a plurality of sound levels or measured times previously set.

The predetermined sound level or measured time may be externally set.

Also, the timing with which a file is deleted to secure free space is when the remaining space of the storage section 101 falls below a predetermined value. Therefore, the timing may be before or during recording of new image data.

EXAMPLE 4

Hereinafter, Example 4 of the present invention will be described with reference to FIG. 4.

Figure 4:
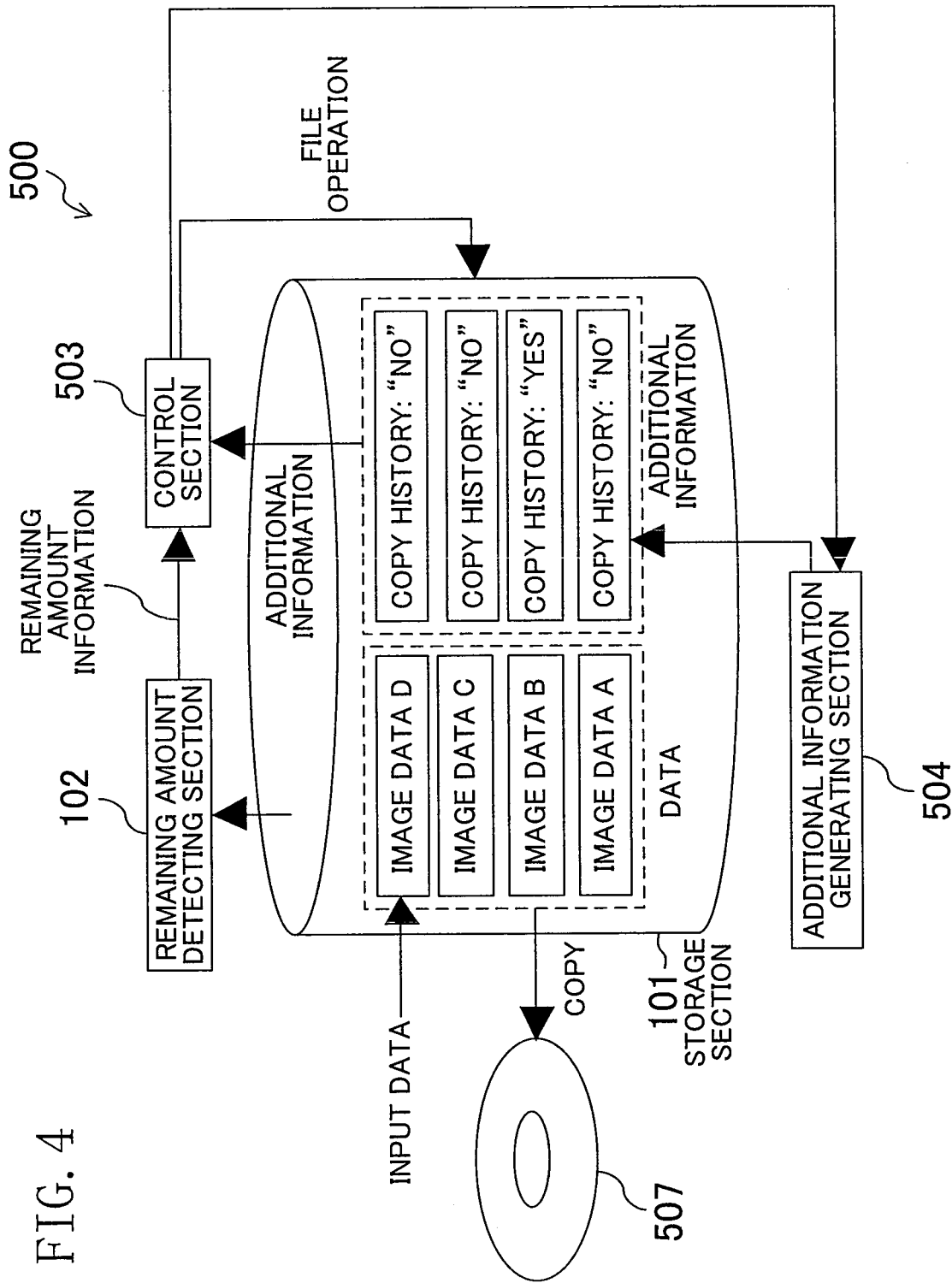
FIG. 4 is a diagram schematically showing a whole configuration of a recording apparatus according to Example 4 of the present invention.

In FIG. 4 showing Example 4, the same parts as those of Example 1 of the present invention are indicated by the same names and reference numerals, and their detailed operations will not be described.

FIG. 4 shows a configuration of a recording apparatus according to Example 4 of the present invention. The recording apparatus 500 of Example 4 is a digital camera apparatus, a camcorder, or a recorder apparatus for recording images or video, which has a storage section 101, a remaining amount detecting section 102, a control section 503, an additional information generating section 504 for generating additional information based on information from the outside, and a copy medium 507 into which data is copied from the storage section 101.

A detailed configuration and an operation of the thus-configured recording apparatus of Example 4 of the present invention will be described.

Input data is recorded and saved into the storage section 101 of the recording apparatus 500. When data stored in the storage section 101 is copied to the copy medium 507, a copy history ("YES") is written as additional information into the storage section 101 by the additional information generating section 504. When remaining space in the storage section 101 detected by the remaining amount detecting section 102 falls below a predetermined value, the control section 503 deletes data having the copy history given by the additional information generating section 204 from image data which has already been stored to secure free space, and allocates the free space to newly input image data.

For example, in FIG. 4, there are four files of image data A to D. The image data D is image data which is being currently recorded or is about to be recorded, and the image data A to C are image data which have already been recorded. The data B has a copy history, and the data A and C have no copy history. In this case, the data B having a copy history is deleted so as to record the image data D, and the image data D is recorded into the deleted region.

As described above, according to Example 4, if remaining space of the storage section 101 in which data can be written becomes small when image data is being currently recorded or is about to be recorded, the control section 503 controls the storage section 101 so that data having a copy history given as additional information is automatically deleted, and is overwritten with the image file which is being currently recorded or is about to be recorded. Thereby, it is possible to continually secure free space in the storage section 101. As a result, it is possible to prevent image data which is being currently recorded or is about to be recorded from failing to be recorded due to a shortage of free space.

This is considerably useful for, for example, a digital camera apparatus or a camcorder for recording images or video. Specifically, if the storage section 101 has only small free space during shooting by the user, then when the user suddenly encounters a decisive moment and needs to record an image, data which has been copied to another medium in the past for saving or the like is deleted, and recording of image data which is being currently recorded or is about to be recorded is given a highest priority.

The above-described technique is also useful for a recorder apparatus for recording images or video. Specifically, in the case of recording or timer recording of a television program, if the storage section 101 has only small free space, then when a decisive moment occurs in a television program which has not been set for timer recording and is being currently broadcast (i.e., recording is suddenly required), data which has been copied to the separate medium 507 in the past for saving or the like is deleted, and recording of the currently broadcast program is given a highest priority.

Note that this example is effective irrespective of whether image data is of moving image or still image. Also, the timing with which data is deleted to secure free space is when the remaining space of the storage section 101 falls below the predetermined value. Therefore, the timing may be before or during recording of new image data.

Also, in this example, the presence ("YES") or absence ("NO") of a copy history is generated as additional information. Additional information is not limited to this. For example, additional information may be about the presence ("YES") or absence ("NO") of a playback history indicating whether or not data has been playbacked.

EXAMPLE 5

Hereinafter, Example 5 of the present invention will be described with reference to FIG. 5.

Figure 5:
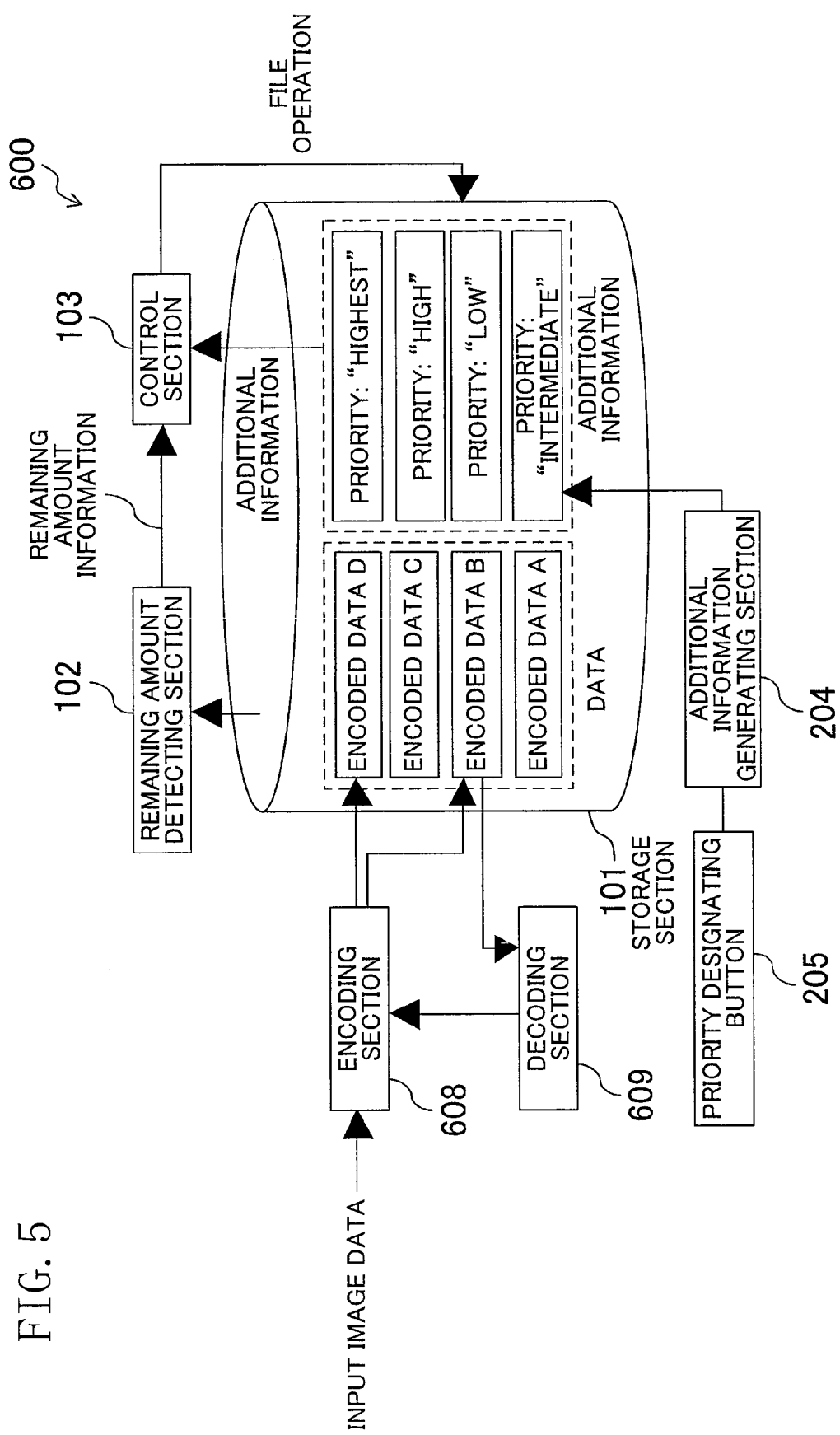
FIG. 5 is a diagram schematically showing a whole configuration of a recording apparatus according to Example 5 of the present invention.

In FIG. 5 showing Example 5, the same parts as those of Example 1 of the present invention are indicated by the same names and reference numerals, and their detailed operations will not be described.

FIG. 5 shows a configuration of a recording apparatus according to Example 5 of the present invention. The recording apparatus 600 of Example 5 is a digital camera apparatus, a camcorder, or a recorder apparatus for recording images or video, which has a storage section 101 for storing input data, a remaining amount detecting section 102 for detecting free space in the storage section 101 to generate remaining amount information, and a control section 203 for operating a file recorded in the storage section 101. The recording apparatus 600 further has a priority designating button (priority button) 205 which is pressed down when the user designates a priority, an additional information generating section 204 for generating additional information based on information from the priority designating button 205, an encoding section 608 for encoding input data to record and save the resultant data into the storage section 101, and a decoding section 609 for decoding data which has been encoded by the encoding section 608 and has been recorded into the storage section 101.

If image data input to the encoding section 608 is data which has already been encoded, the encoding section 608 does not perform an encoding process and writes the input data, as it is, into the storage section 101.

Input image data is recorded and saved into the storage section 101 of the recording apparatus 600. Also, a priority designated by the user (operator) pressing down the priority designating button 205 is written as additional information into the storage section 101 of the recording apparatus 600 by the additional information generating section 204.

A detailed configuration and an operation of the thus-configured recording apparatus of Example 5 of the present invention will be described.

Image data input to the recording apparatus 600 is encoded by the encoding section 608 and the resultant encoded data is stored as a file into the storage section 101. Additional information (priority) generated by the additional information generating section 204 is also stored into the storage section 101.

When remaining space in the storage section 101 detected by the remaining amount detecting section 102 falls below a predetermined value, the control section 103 ranks pieces of image data already stored in the storage section 101 based on the priorities of the pieces of image data given by the additional information generating section 204, decodes encoded data having a lower priority using the decoding section 609, encodes the decoded data again (re-encoding) using the encoding section 608 so that the resultant encoded data becomes smaller in size than the original encoded data, overwrites the original encoded data with the re-encoded data to secure free space, and allocates the free space to newly input image data to be recorded.

For example, in FIG. 5, there are four files of image data A to D. The image data D is image data which is being currently recorded or is about to be recorded, and the image data A to C are image data which have already been recorded. A to C indicate the order of time when the image data were recorded into the storage section 101, the earliest first. The additional information generating section 204 ranks the image data A to D in accordance with the priorities of designated by the priority designating button 205, as "immediate", "low", "high", and "highest", respectively. The image data D has the "highest" priority because it is being currently recorded or is about to be recorded. In this case, the image data D is recorded as follows: the image data B having the "low" priority is decoded, and is then encoded again (re-encoding) so that the re-encoded data becomes smaller in size than the original encoded data; the original encoded data is overwritten with the re-encoded data to secure a recordable region in the storage section 101; and the image data D is recorded into the recordable region. If there is still a shortage of free space required for recording of the image data D even after the image data B is re-encoded and overwritten, the image data A having the "intermediate" priority is re-encoded and overwritten.

As described above, according to Example 5, if remaining space of the storage section 101 in which data can be written becomes small when image data is being currently recorded or is about to be recorded, the control section 103 controls the storage section 101 so that image data having a lower priority is automatically re-encoded and overwritten using priorities recorded as additional information, and the image file which is being currently recorded or is about to be recorded is recorded into the resultant free space. Thereby, it is possible to continually secure free space in the storage section 101. As a result, it is possible to prevent image data which is being currently recorded or is about to be recorded from failing to be recorded due to a shortage of free space.

This is considerably useful for, for example, a digital camera apparatus or a camcorder for recording images or video. Specifically, the user previously performs shooting while pressing one or a plurality of priority designating buttons 205 provided on the recording apparatus 600 to set a priority for a scene which is shot by the user. If the storage section 101 has only small free space, then when the user suddenly encounters a decisive moment and needs to record an image, data of a scene which was shot in the past and does not have a very high priority is deleted, and recording of image data which is being currently recorded or is about to be recorded is given a highest priority.

The above-described technique is also useful for a recorder apparatus for recording images or video. Specifically, in the case of recording or timer recording of a television program, the user previously presses one or a plurality of priority designating buttons provided on the apparatus to set a priority for the program. If the storage section 101 has only small free space, then when the user suddenly encounters a decisive moment in a television program which is being currently broadcast, but for which timer recording has not been made, and needs to record the program, data of a program which was recorded in the past and does not have a very high priority is deleted, and recording of the currently broadcast program is given a highest priority.

Note that this example is effective irrespective of whether image data is of moving image or still image. Also, although a priority is designated by pressing down the priority designating button 205 during image recording in this example, a priority may be designated by pressing down the priority designating button 205 during playback of a recorded image.

Also, the timing with which a file is deleted to secure free space is when the remaining space of the storage section 101 falls below the predetermined value. Therefore, the timing may be before or during recording of new image data.

The encoding section 608, when compressing a data size, decodes and then re-encodes encoded data so that, for example, the re-encoded data to be stored has a smaller bit rate than that of the original encoded data. The bit rate refers to a bit amount per unit time with which compression-encoded data is represented. For example, if original encoded data has a bit rate of 10 Mbps, then when the data is re-encoded by the encoding section 608 to a bit rate of 8 Mbps, the data amount of encoded data after compression is smaller by 2 M bits per second than that of the original data.

Further, for example, the encoding section 608, when compressing a data size, may decode and then re-encode encoded data so that the data is quantized with a larger quantization value than the original quantization value. For example, in the case of encoding standards employing DCT, the encoding section 608 may divide each coefficient after DCT by a larger quantization value than that which was used for the original data, to quantize decoded data, thereby representing re-encoded data using a smaller value than that after quantization of the original data to reduce the allocated encoded amount.

In addition, for example, the encoding section 608, when compressing a data size, may decode and then re-encode original encoded data so that re-encoded data has a larger keyframe interval than that of the original encoded data. The keyframe as used herein refers to a frame which is encoded using only intra-frame information without inter-frame prediction (e.g., an I-picture in the MPEG standards). I-pictures can be decoded independently of other pictures, and therefore, can be used as access points during random access. However, I-pictures, for which inter-frame prediction is not used as is different from P-pictures and B-pictures, have a low compression ratio and a large encoding amount. When the insertion interval of I-pictures is small in an encoded moving image sequence, i.e., the occurrence frequency of I-pictures is large, the encoding amount of the whole moving image sequence is large. Therefore, the encoding amount of an encoded moving image sequence may be reduced by increasing the insertion interval of I-pictures to reduce the occurrence frequency of I-pictures.

Also, for example, the encoding section 608, when compressing a data size, may decode and then re-encode encoded data so as to obtain a smaller image size than the original one.

Also, during the data size compression, the encoding section 608 may re-encode encoded data using an encoding method (algorithm) having a higher data compression efficiency than that of the original encoding method (algorithm). For example, if data having the lowest priority has been encoded using MPEG2 and has been stored in the storage section 101, the encoded data may be decoded by the decoding section 609, and thereafter, the encoding section 608 may re-encode the decoded data using H.264 to reduce the amount of code, and store the re-encoded data into the storage section 101.

In addition, in this example, when a recorder apparatus is not used (late at night, etc.), the control section 103 may detect free space in the storage section 101, determine that the free space is less than a predetermined amount in view of, for example, timer recordings of programs which will be broadcast on the following days, decode encoded data in accordance with priorities described above, and re-encodes the decoded data to a smaller amount which can be recorded and saved. Alternatively, when timer recording is performed, data having a low priority may be presented to the user so as to prompt the user to delete or re-encode the data.

Also, in this example, the encoding section 608 and the decoding section 609 are added to the recording apparatus of FIG. 1. Alternatively, the encoding section 608 and the decoding section 609 may be added to the recording apparatus of FIG. 2 or 3.

EXAMPLE 6

Hereinafter, Example 6 of the present invention will be described with reference to FIG. 6.

Figure 6:
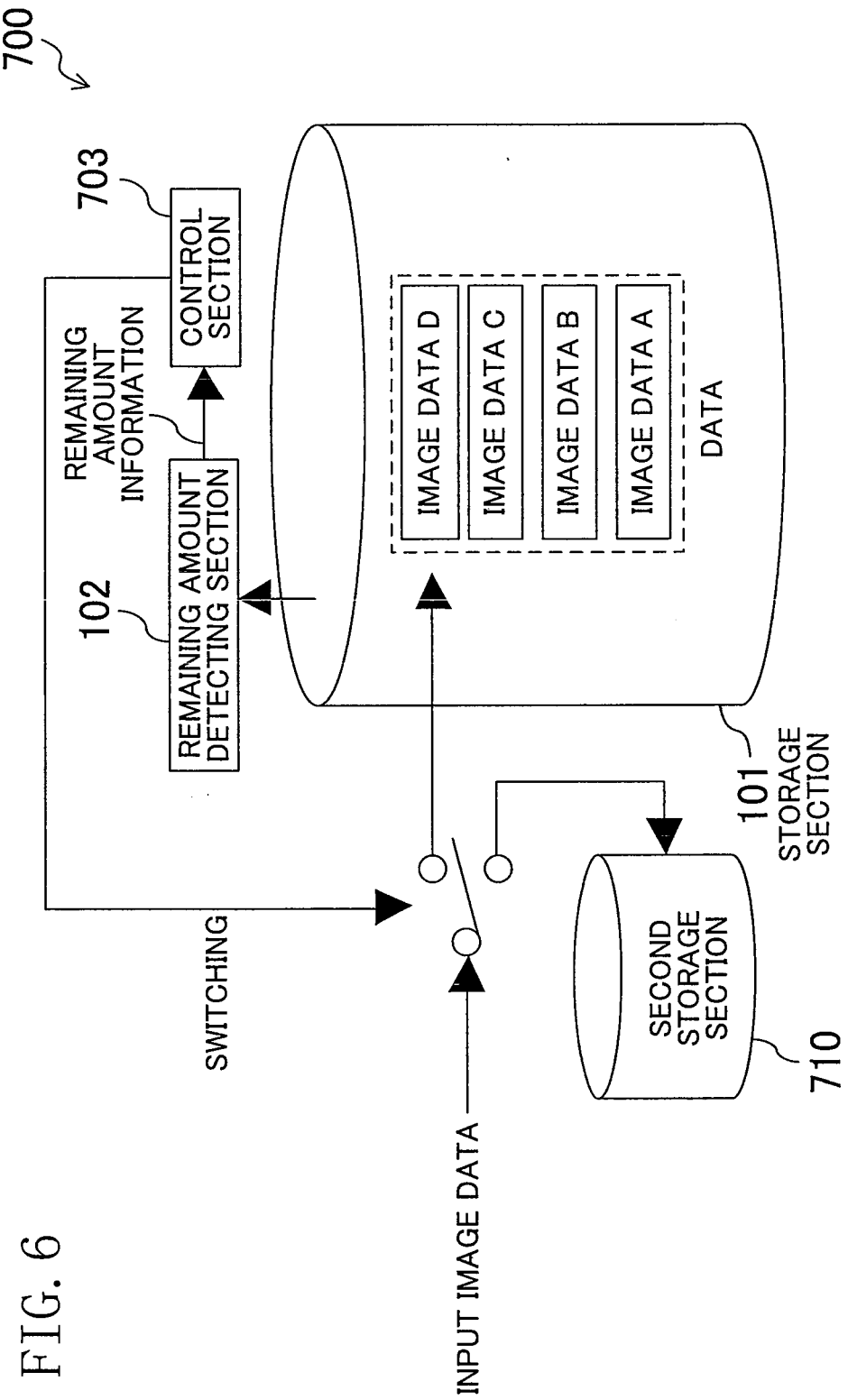
FIG. 6 is a diagram schematically showing a whole configuration of a recording apparatus according to Example 6 of the present invention.

In FIG. 6 showing Example 6, the same parts as those of Example 1 of the present invention are indicated by the same names and reference numerals, and their detailed operations will not be described.

FIG. 6 shows a configuration of a recording apparatus according to Example 6 of the present invention. The recording apparatus 700 of Example 6 is a digital camera apparatus, a camcorder, or a recorder apparatus for recording images or video, which has a storage section 101, a remaining amount detecting section 102, a control section 703, and a second storage section 710. One of the first and second storage sections 101 and 710 is selected, as a target into which input data will be recorded, by the control section 703.

A detailed configuration and an operation of the thus-configured recording apparatus of Example 6 of the present invention will be described. If the storage section 101 has been selected as a data recording target and data is being recorded or is about to be recorded into the storage section 101, then when free space in the storage section 101 detected by the remaining amount detecting section 102 falls below a predetermined value, the control section 703 switches a data recording target from the storage section 101 to the second storage section 710 without overwriting data recorded and held in the storage section 101. In this case, the control section 703 does not overwrite data recorded and held in the storage section 101, and therefore, it is not necessary to set priorities for pieces of recorded and held data.

As described above, according to Example 6, if remaining space of the storage section 101 in which data can be written becomes small when image data is being currently recorded or is about to be recorded, the control section 703 switches a recording target to the second storage section 710. Thereby, it is possible to secure free space. As a result, it is possible to prevent image data which is being currently recorded or is about to be recorded from failing to be recorded due to a shortage of free space.

For example, it is assumed that a digital camera apparatus or a camcorder for recording images or video includes a plurality of recordable devices (a hard disk drive, an optical disc drive, a memory card, etc.), and, for example, a memory card for backup recording is loaded while captured images are normally recorded into a hard disk. If the hard disk has only small free space, then when the user suddenly encounters a decisive moment and needs to record an image, it is possible to prevent the image from failing to be recorded, by switching a recording target to the memory card.

Also, in the case of a recorder apparatus for recording images or video which has two recordable devices (e.g., a hard disk drive and an optical disc drive) as recording media, if an optical disc is loaded in the optical disc drive for backup recording while a television program is recorded into the hard disk, then when the recordable space of the hard disk becomes small, a recording target is switched to the optical disc, thereby making it possible to prevent the recorder apparatus from failing to record the program.

Note that this example is effective irrespective of whether image data is of moving image or still image. Also, the timing with which recording targets are switched is when the remaining space of the storage section 101 falls below the predetermined value. Therefore, the timing may be before or during recording of new image data.

EXAMPLE 7

Hereinafter, Example 7 of the present invention will be described with reference to FIG. 7.

Figure 7:
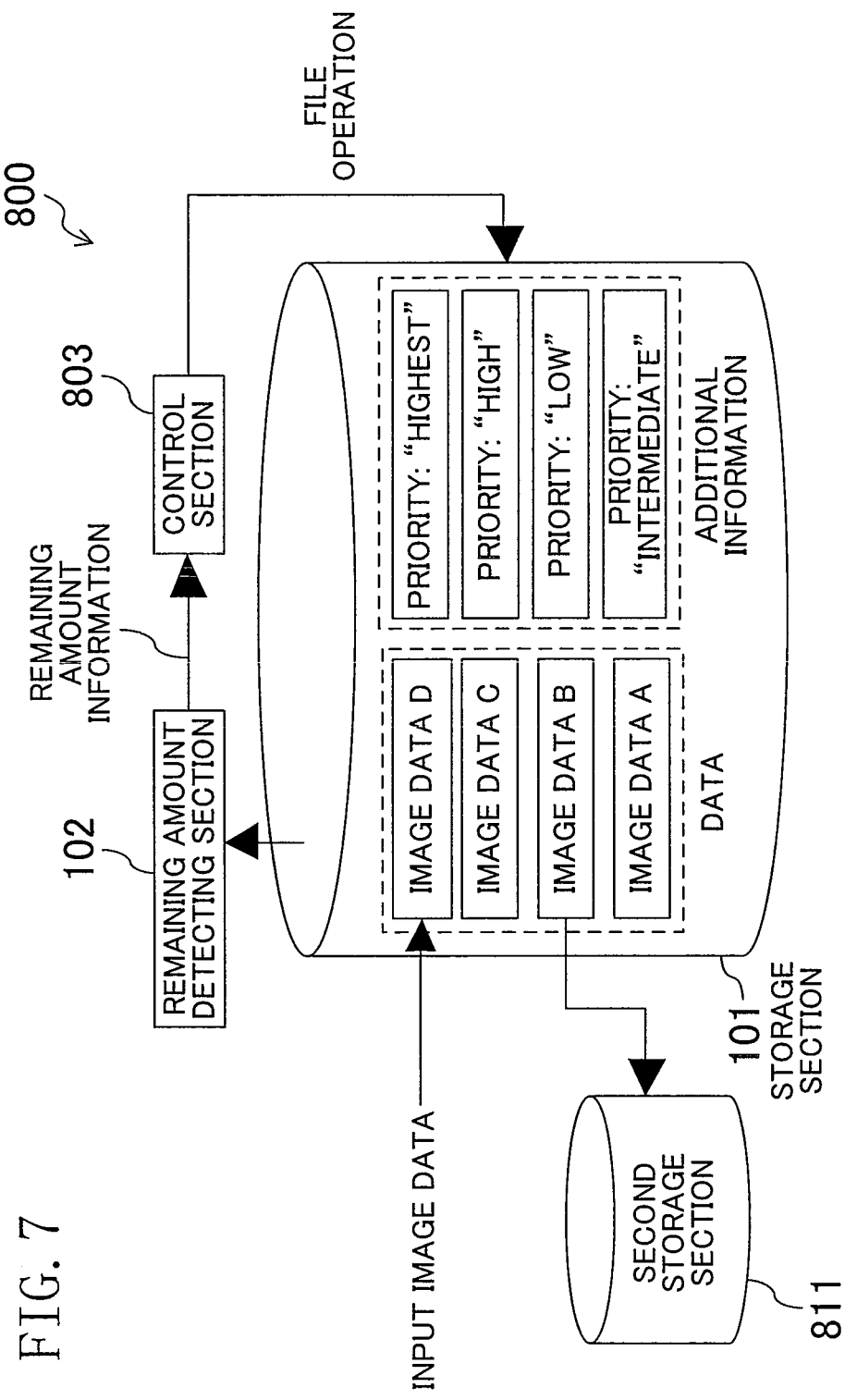
FIG. 7 is a diagram schematically showing a whole configuration of a recording apparatus according to Example 7 of the present invention.

In FIG. 7 showing Example 7, the same parts as those of Example 1 of the present invention are indicated by the same names and reference numerals, and their detailed operations will not be described.

FIG. 7 shows a configuration of a recording apparatus according to Example 7 of the present invention. The recording apparatus 800 of Example 7 is a digital camera apparatus, a camcorder, or a recorder apparatus for recording images or video, which has a storage section 101, a remaining amount detecting section 102, a control section 803, and a second storage section 811. Data recorded in the storage section 101 can be moved to the second storage section 811 by the control section 803. Pieces of data recorded in the storage section 101 are also given respective corresponding pieces of additional information, with which the priorities of the pieces of data are ranked.

A detailed configuration and an operation of the thus-configured recording apparatus of Example 7 of the present invention will be described. If remaining space in the storage section 101 detected by the remaining amount detecting section 102 falls below a predetermined value when data is being currently recorded or is about to be recorded, the control section 803 moves data having a lowest priority from the storage section 101 to the second storage section 811, thereby securing recordable space.

For example, in FIG. 7, there are four files of image data A to D. The image data D is image data which is being currently recorded or is about to be recorded, and the image data A to C are image data which have already been recorded. Of the image data A to C, the image data B has the lowest priority and the image data C has the highest priority. In this case, the image data B having the lowest priority is moved to the second storage section 811 to secure free space in the storage section 101 so as to record the image data D, and records the image data D into the free space. If there is still a shortage of free space required for recording of the image data D even after the image data B is moved, the image data A having the second lowest priority is moved to the second storage section 811.

As described above, according to Example 7, if remaining space of the storage section 101 in which data can be written becomes small when image data is being currently recorded or is about to be recorded, the control section 803 moves image data having a lowest priority from the storage section 101 to the second storage section 811. Thereby, it is possible to continually secure free space in the storage section 101. As a result, it is possible to prevent image data which is being currently recorded or is about to be recorded from failing to be recorded due to a shortage of free space.

For example, it is assumed that a digital camera apparatus or a camcorder for recording images or video includes a plurality of recordable devices (a hard disk drive, an optical disc drive, a memory card, etc.), and, for example, a memory card for backup recording is loaded while captured images are normally recorded into a hard disk. If the hard disk has only small free space, then when the user suddenly encounters a decisive moment and needs to record an image, it is possible to prevent the image from failing to be recorded, by moving data having the lowest priority in the hard disk to the memory card to secure free space in the hard disk.

Also, in the case of a recorder apparatus for recording images or video which has two recordable devices (e.g., a hard disk drive and an optical disc drive) as recording media, if an optical disc is loaded in the optical disc drive for backup recording while a television program is recorded into the hard disk, then when the recordable space of the hard disk becomes small, data having a lowest priority in the hard disk is moved to the optical disc to secure free space in the hard disk, thereby making it possible to prevent the recorder apparatus from failing to record the program.

Note that this example is effective irrespective of whether image data is of moving image or still image. Also, the timing with which recording targets are switched is when the remaining space of the storage section 101 falls below the predetermined value. Therefore, the timing may be before or during recording of new image data.

What is claimed is:

1. A recording apparatus comprising:
a storage section for recording and holding any data and additional information corresponding to the data;
a remaining amount detecting section for detecting remaining recordable space in the storage section;
a control section for operating the data recorded and held in the storage section; and
an additional information generating section for generating the additional information to be recorded and held in the storage section, wherein:
the control section sets priorities for the data recorded and held in the storage section based on the additional information generated by the additional information generating section irrespective of the order in which the data were recorded and held into the storage section,
the remaining amount detecting section is configured to detect the remaining recordable space before the start of recording of data into the storage section,
the remaining amount detecting section is further configured to detect the remaining recordable space during recording of the data into the storage section, and
if the detected remaining recordable space is below a predetermined value, the control section deletes, or compresses a data size of, data having a lowest priority based on the priorities.

2. The recording apparatus of claim 1, further comprising:
one or more priority buttons each indicating a priority,
wherein, when an operator presses the one or more priority buttons, the additional information generating section generates additional information indicating priorities corresponding thereto.

3. The recording apparatus of claim 1, further comprising:
a program information obtaining section for analyzing information about the data to obtain keywords,
wherein the additional information generating section handles, as additional information, the keyword obtained by the program information obtaining section, and
the control section sets priorities for the data based on whether or not the keywords obtained by the program information obtaining section match respective predetermined keywords.

4. The recording apparatus of claim 1, further comprising:
a program information obtaining section for analyzing information about the data to obtain rating points of TV programs,
wherein the control section sets higher priorities for the data having higher rating points of the TV programs, and overwrites a region in which data having a lowest priority is stored, with data which is about to be recorded or is being currently recorded.

5. The recording apparatus of claim 1, further comprising:
a program information obtaining section for analyzing information about the data to obtain game results of sports programs,
wherein the additional information generating section handles, as additional information, the game results of the sports programs obtained by the program information obtaining section, and
the control section sets priorities for the data based on whether or not the game results of the sports programs match a predetermined game result.

6. The recording apparatus of claim 1, further comprising:
a sound level detecting section for detecting sound levels of each piece of the data,
wherein the additional information generating section detects a highest one of the sound levels detected by the sound level detecting section and generates the highest sound level as additional information.

7. The recording apparatus of claim 6, wherein the sound level detecting section, when data is recorded into the storage section, detects sound levels of the data.

8. The recording apparatus of claim 6, wherein the sound level detecting section, when data is read from the storage section, detects sound levels of the data.

9. The recording apparatus of claim 6, wherein the additional information generating section determines and generates, as additional information, priorities for the data using one or a plurality of predetermined sound level thresholds based on the highest sound levels of the data detected by the sound level detecting section.

10. The recording apparatus of claim 9, wherein in the additional information generating section, the sound level thresholds for determining priorities can be externally set.

11. The recording apparatus of claim 6, wherein the additional information generating section further measures and generates, as additional information, durations for which the sound levels detected by the sound level detecting section continue to be higher than or equal to a predetermined sound level.

12. The recording apparatus of claim 11, wherein the additional information generating section determines and generates, as additional information, priorities based on the sound level durations using one or a plurality of predetermined duration thresholds.

13. The recording apparatus of claim 11, wherein in the additional information generating section, the sound level thresholds for measuring durations can be externally set.

14. The recording apparatus of claim 12, wherein in the additional information generating section, the one or plurality of durations for determining priorities can be externally set.

15. The recording apparatus of claim 1, wherein the additional information generating section generates additional information indicating copy histories of the data or additional information indicating whether or not the data have been playbacked.

16. The recording apparatus of claim 1, wherein
the data recorded and held in the storage section is data encoded before the recording and holding, and
during the data size compression, the control section re-encodes the encoded data recorded and held in the storage section so that the resultant data has a smaller bit rate than that of the encoded data recorded and held in the storage section.

17. The recording apparatus of claim 1, wherein
the data recorded and held in the storage section is data encoded before the recording and holding, and
during the data size compression, the control section re-encodes the encoded data recorded and held in the storage section so that the encoded data recorded and held in the storage section is quantized using a larger quantization value than that of the encoded data recorded and held in the storage section.

18. The recording apparatus of claim 1, wherein
the data recorded and held in the storage section is data encoded before the recording and holding, and
during the data size compression, the control section re-encodes the encoded data recorded and held in the storage section so that the resultant data has a larger keyframe interval than that of the encoded data recorded and held in the storage section.

19. The recording apparatus of claim 1, wherein
the data recorded and held in the storage section is data encoded before the recording and holding, and
during the data size compression, the control section re-encodes the encoded data recorded and held in the storage section so that the resultant data has a smaller image size than that of the encoded data recorded and held in the storage section.

20. The recording apparatus of claim 1, wherein
the data recorded and held in the storage section is data encoded before the recording and holding, and
during the data size compression, the control section re-encodes the encoded data recorded and held in the storage section using an encoding method having a higher data compression efficiency than that of the original encoding method.

* * * * *